United States Patent
Rosa

(10) Patent No.: US 10,288,180 B2
(45) Date of Patent: May 14, 2019

(54) MULTIPLE PARTS REED VALVE AND METHOD OF MANUFACTURING

(71) Applicant: Barnes Group Inc., Bristol, CT (US)

(72) Inventor: Jose Ubaldino Rosa, Sao Paulo (BR)

(73) Assignee: Barnes Group Inc., Bristol, CT (US)

( * ) Notice: Subject to any disclaimer, the term of this patent is extended or adjusted under 35 U.S.C. 154(b) by 34 days.

(21) Appl. No.: 15/293,484

(22) Filed: Oct. 14, 2016

(65) Prior Publication Data
US 2017/0030471 A1 Feb. 2, 2017

Related U.S. Application Data

(62) Division of application No. 14/339,872, filed on Jul. 24, 2014.

(60) Provisional application No. 61/858,728, filed on Jul. 26, 2013.

(51) Int. Cl.
| | |
|---|---|
| *F04B 39/10* | (2006.01) |
| *F16K 15/14* | (2006.01) |
| *F16K 15/16* | (2006.01) |
| *B23P 15/00* | (2006.01) |

(52) U.S. Cl.
CPC .......... *F16K 15/144* (2013.01); *B23P 15/002* (2013.01); *F04B 39/1073* (2013.01); *F16K 15/16* (2013.01); *Y10T 29/49416* (2015.01); *Y10T 137/7891* (2015.04)

(58) Field of Classification Search
CPC .... F16K 15/16; F16K 15/144; F04B 39/1073; Y10T 29/49416; Y10T 137/7981; B23P 15/002
See application file for complete search history.

(56) References Cited

U.S. PATENT DOCUMENTS

| | | |
|---|---|---|
| 1,768,830 A | 7/1930 | Dansereau |
| 2,062,206 A | 11/1936 | Browne |
| 2,899,981 A | 8/1959 | Binks |
| 2,908,287 A | 10/1959 | Augustin |

(Continued)

FOREIGN PATENT DOCUMENTS

| | | |
|---|---|---|
| BR | P19604645-7 | 6/1998 |
| DE | 2935431 | 3/1981 |

(Continued)

*Primary Examiner* — Jacob J Cigna
*Assistant Examiner* — Lee A Holly
(74) *Attorney, Agent, or Firm* — Fay Sharpe LLP

(57) ABSTRACT

An improved membrane valve and method for manufacturing such membrane valve. The improved membrane valve can be used for transferring fluids or gases in hermetic or semi-hermetic compressors, including a method and system for manufacturing a membrane valve and a membrane valve with applications for use in several motors, particularly in hermetic or semi-hermetic compressors which use, as a refrigeration fluid, an appropriate type of gas thus promoting the refrigeration physical affect. A body and a membrane of the membrane valve are produced from substantially thin metallic plates separately in accordance to an available process and can be subjected to rounding in order to eliminate live corners, and then juxtaposed thus composing the valve, with the above mentioned membrane on one side, fitted to the body which is fixed through a connection process and, on the other side, left free to oscillate.

34 Claims, 11 Drawing Sheets

(56) References Cited

U.S. PATENT DOCUMENTS

| | | | |
|---|---|---|---|
| 3,568,712 | A | 3/1971 | Rinehart |
| 3,998,571 | A | 12/1976 | Falke |
| 4,088,428 | A | 5/1978 | Bannister et al. |
| 4,193,424 | A | 3/1980 | Hrabal |
| 4,257,458 | A | 3/1981 | Kondo et al. |
| 4,406,590 | A | 9/1983 | Kessler |
| 4,532,685 | A | 9/1985 | Itho et al. |
| 4,642,037 | A | 2/1987 | Fritchman |
| 4,770,058 | A | 9/1988 | Lilie et al. |
| 4,879,976 | A | 11/1989 | Boyesen |
| 5,025,828 | A | 6/1991 | Lin |
| 5,035,050 | A | 7/1991 | Cowen |
| 5,060,374 | A | 10/1991 | Findlanl et al. |
| 5,062,779 | A | 11/1991 | Da Costa |
| 5,110,272 | A | 5/1992 | Peruzzi et al. |
| 5,140,748 | A | 8/1992 | Kandpal |
| 5,197,867 | A | 3/1993 | Kandpal |
| 5,209,260 | A | 5/1993 | Baek |
| 5,228,468 | A | 7/1993 | Kapadia |
| 5,373,867 | A | 12/1994 | Boyesen et al. |
| 6,227,825 | B1 * | 5/2001 | Vay .................... F04B 39/1073 137/15.19 |
| 2009/0087329 | A1 * | 4/2009 | Obara ................ F04B 39/1066 417/559 |

FOREIGN PATENT DOCUMENTS

| | | | |
|---|---|---|---|
| DE | 274649 | 12/1989 | |
| DE | 4039786 | 6/1992 | |
| EP | 1691735 | 8/2006 | |
| WO | WO 2012065238 A1 * | 5/2012 | .......... F04B 39/1073 |

\* cited by examiner

MULTIPLE PARTS REED VALVE AND METHOD OF MANUFACTURING

This application is a divisional application of U.S. patent application Ser. No. 14/339,872 filed Jul. 24, 2014, which in turn claims priority on U.S. Provisional Patent Application Ser. No. 61/858,728 filed Jul. 26, 2013, which is incorporated herein by reference.

The present invention is directed to valves, more particularly to membrane or flapper valves, and even more particularly to an improved membrane valve that can be used in compressors and other types of applications.

BACKGROUND OF THE INVENTION

A membrane valve, which is commonly used in the area of refrigeration, and particularly used in hermetic and/or semi-hermetic compressors to promote the refrigeration effect, is well known in the art. The membrane valve, allows gas to be transferred from one chamber to the other, according to a pre-determined frequency.

In regards to the dynamics of operation, membrane valves are comprised of an external section to be attached to the housing of the body of a compressor or the like and at least one internal section (membrane or reed) that is free to move (oscillate) in relation to the first section. The internal section is designed to be positioned over an area which is the intermediate point between a fluid entry duct and a suction chamber and which transfers such fluid to a chamber equally furnished with an exhaust valve. In this manner, at least one of the above mentioned internal sections oscillates in accordance to the behavior of the chamber and, in this condition, the exhaust valve is closed. In a following stage, where the fluid is compressed into the chamber, the membrane valve closes, while the exhaust valve is opened, thus transferring the fluid to another duct, with the piston of a hermetic compressor providing the suction and transfer functions.

There exists an extensive variety of single-piece membrane valves, generally made of high carbon or stainless steel. Such membrane valves are described in detail in U.S. Pat. No. 6,227,825 and Brazilian Patent No. P19702470-8, both of which are incorporated herein by reference. The limits associated with such monolithic structures are also described in detail in U.S. Pat. No. 6,227,825.

A multi-piece membrane valve is described in detail in U.S. Pat. No. 6,227,825 which overcomes many of the disadvantages associated with monolithic structure of these single-piece membrane valves. The external section and internal section of the membrane valve is joined together by laser welding using a laser, brazing, gluing or the equivalent. Although the connection arrangement disclosed in U.S. Pat. No. 6,227,825 solves many of the problems of past membrane valves as described in Brazilian Patent No. P19702470-8, the connection arrangement has some disadvantages. The consistency and quality of the connection arrangement formed by laser welding can vary from part to part. Also, the costs associated with laser welding can be higher that with using a single piece stamping process. Furthermore, because a weld bead generally extends some distance above the surface of the body or reed of the piece, the weld does not allow or makes it difficult to form a piece wherein the full top surface and/or the full bottom surface of the membrane valve lies in the same plane.

The present invention is directed to a further improvement to the multi-piece membrane valve as described in detail in U.S. Pat. No. 6,227,825.

SUMMARY OF THE INVENTION

The present invention is directed to an improved membrane valve and a method of manufacturing such membrane valve. The membrane valve includes a body and one or more reeds or membranes that are connected to the body. The materials used to form the body and one or more reeds or membranes can be the same or different. In one non-limiting arrangement, the materials used to form the body and at least one of the reeds or membranes are different. In another non-limiting arrangement, the materials used to form the body and all of the reeds or membranes are different. The materials that can be used to form the body and the reeds or membranes are non-limiting (e.g., metal, plastic, ceramic, wood, composite materials, fiber-reinforced materials, etc.). In one non-limiting arrangement, the materials used to form the body and/or the reeds or membranes include metal. The body and the one or more reeds or membranes can be formed by a variety of processes (e.g., stamping process, laser cutting process, molding process, etching process, photo etching process, mechanical cutting process, an extrusion process, etc.). The shape, size, configuration and thickness of the body and the one or more reeds or membranes are non-limiting. In one non-limiting embodiment, the connection arrangement between the body of the membrane valve and at least one of the reeds or membranes is a compression fit connection. As can be appreciated, all or some of the reeds or membranes can be connected to the body by a compression fit connection. The compression fit connection can form the only connection between the body and the one or more reeds or membranes, or additional connection arrangements (e.g., weld, adhesive, polymer coating, magnetic connection, solder, brazing, etc.) can be used in combination with the compression fit; however, this is not required. The compression fit connection can be formed by one or more compression connections. In one non-limiting arrangement, the compression fit connection is formed by a plurality (e.g., 2, 3, 4, 5, 6, 7, 8, 9, 10, etc.) of compression connections that are spaced from one another.

In another and/or alternative non-limiting aspect of the present invention, the body of the membrane valve and at least one of the reeds or membranes is formed of a different material. In one non-limiting embodiment, the body is formed of a material that is more deformable (i.e., greater elastic deformation) than the material used to form one or more of the reeds or membranes; however, this is not required. In one non-limiting arrangement, the body is formed of a material that is more deformable than the material used to form all of the reeds or membranes. In another and/or alternative non-limiting embodiment, the body is formed of a material that has a hardness (i.e., based on Mohs hardness scale) that is less than the hardness of one or more of the reeds or membranes; however, this is not required. In one non-limiting arrangement, the body is formed of a material that has a hardness that is less than the hardness of all of the reeds or membranes.

In still another and/or alternative non-limiting aspect of the present invention, the connection arrangement includes a compression fit connection formed of one or more recesses on the side and/or end of the reeds or membranes and the body that includes corresponding connection extensions that are designed to fit in a corresponding recess when the reed or membrane is connected to the body. As such, when the reeds or membranes are compression-fitted to the body, all or a portion of a connection extension deforms, compresses, etc. and then moves into a recess, thereby securing the reed or membrane to the body. Generally, when the reed or membrane includes two or more recesses that are each designed to connect to a respective connection extension, each of the connection extensions are inserted at the same time into the respective recess in the reed or membrane; however, this is not required. Generally, the shape of the connection extension for a particular recess has a shape that is generally the same as the shape of the recess; however, this is not required. Generally, the cross-sectional area of the portion of the connection extension that is to be inserted into a particular recess is greater than a cross-sectional area of the recess so that a compression fit is formed when the connection extension is inserted into the recess; however, this is not required. The size, shape and/or configuration of the recesses and connection extensions are non-limited.

In yet another and/or alternative non-limiting aspect of the present invention, the connection arrangement includes a compression fit connection formed of one or more recesses on the body, and the side and/or end of the reeds or membranes includes corresponding connection extensions that are designed to fit in a corresponding recess when the reed or membrane is connected to the body. As such, when the reeds or membranes are compression fitted to the body, all or a portion of a connection extension deforms, compresses, etc. and then moves into a recess, thereby securing the reed or membrane to the body. Generally, when the reed or membrane includes two or more connection extensions that are each designed to connect to a respective recess in the body, each of the connection extensions are inserted at the same time into the respective recess; however, this is not required. Generally, the shape of the connection extension for a particular recess has a shape that is generally the same as the shape of the recess; however, this is not required. Generally, the cross-sectional area of the portion of the connection extension that is to be inserted into a particular recess is greater than a cross-sectional area of the recess so that a compression fit is formed when the connection extension is inserted into the recess; however, this is not required. The size, shape and/or configuration of the recesses and connection extensions are non-limited.

In still yet another and/or alternative non-limiting aspect of the present invention, the connection arrangement includes a) a compression fit connection formed of one or more recesses on the side and/or end of the reeds or membranes and the body that includes corresponding connection extensions that are designed to fit in a corresponding recess when the reed or membrane is connected to the body, and b) a compression fit connection formed of one or more recesses on the body and the side and/or end of the reeds or membranes includes corresponding connection extensions that are designed to fit in a corresponding recess when the reed or membrane is connected to the body. In one embodiment, the compression fit connection is the primary or only connection between the body and the reed or membrane. In one non-limiting confirmation, the compression fit connection is the only connection between the body and the reed or membrane. In such an arrangement, there is no weld, solder, brazing, adhesive, bonding agent, etc. that is used in addition to the compression fit connection to secure the reed or membrane to the body.

In another and/or alternative non-limiting aspect of the present invention, the entrance to the recess has a width that is less than a maximum cross-sectional length of a portion of the recess that is recessed or spaced from the entrance; however, this is not required. As such, the width of the recess is narrower than one or more portions of the recess that is recessed or spaced from the entrance to the recess. In one non-limiting embodiment, the cross-sectional shape of the one or more recesses has an edge radius; however, other shapes can be used. In one non-limiting configuration of a recess, the recess includes a C-shaped portion; however, this is not required. In one non-limiting arrangement, the recess has a lollipop shape or standard light bulb shape. In another and/or alternative non-limiting embodiment of the invention, the entrance to one or more recess has a radius of curvature; however, this is not required. In still another and/or alternative non-limiting embodiment of the invention, when the recess is positioned on a side of reed or membrane, the width of the recess entrance is less than about 25% the maximum longitudinal length of the reed or membrane, typically less than about 20% the maximum longitudinal length of the reed or membrane, more typically less than about 15% the maximum longitudinal length of the reed or membrane, still more typically less than about 10% the maximum longitudinal length of the reed or membrane, yet more typically less than about 8% the maximum longitudinal length of the reed or membrane, and still yet more typically less than about 7% the maximum longitudinal length of the reed or membrane. In yet another and/or alternative non-limiting embodiment of the invention, when the recess is positioned on an end of the reed or membrane, the maximum longitudinal length of the recess is less than about 25% the maximum longitudinal length of the reed or membrane, typically less than about 20% the maximum longitudinal length of the reed or membrane, more typically less than about 15% the maximum longitudinal length of the reed or membrane, still more typically less than about 10% the maximum longitudinal length of the reed or membrane, yet more typically less than about 9% the maximum longitudinal length of the reed or membrane, and still yet more typically less than about 8% the maximum longitudinal length of the reed or membrane. In still another and/or alternative non-limiting embodiment of the invention, when the recess is positioned on the end of reed or membrane, the width of the recess entrance is less than about 35% the maximum width of the reed or membrane, typically less than about 30% the maximum width of the reed or membrane, more typically less than about 25% the maximum width of the reed or membrane, still more typically less than about 20% the maximum width of the reed or membrane, yet more typically less than about 15% the maximum width of the reed or membrane, and still yet more typically less than about 10% the maximum width of the reed or membrane.

In still another and/or alternative non-limiting aspect of the present invention, the entrance to one or more recesses has a radius of curvature; however, this is not required. This radius of curvature on the entrance of the recess, when used, can be used to facilitate in the connecting of the reeds or membranes to the body. The rounding and/or softening of one or more corners at the entrance of the recess can also reduce tension accumulation of the reeds or membranes, thus allowing for a longer service life.

In yet another and/or alternative non-limiting aspect of the present invention, the edge of the recess that is to first contact a corresponding connection extension when the reed or membrane is being connected to the body can be a tapered surface; however, this is not required. This tapered surface, when used, can be used to facilitate in the connecting of the reeds or membranes to the body. The angle of taper is non-limiting. The taper can exist in part or through the full thickness of the recess.

In still yet another and/or alternative non-limiting aspect of the present invention, the edge of the connection extension that is to first contact a corresponding recess when the reed or membrane is being connected to the body can be a tapered surface; however, this is not required. This tapered surface, when used, can be used to facilitate in the connecting of the reeds or membranes to the body. The angle of taper is non-limiting. The taper can exist in part or through the full thickness of the connection extension.

In another and/or alternative aspect of the present invention, the shape and/or size of the body and/or the one or more reeds or membranes are non-limiting. The materials used to form the body and/or the one or more reeds or membranes are non-limiting. The thickness of the body and/or the one or more reeds or membranes is non-limiting. Generally, the thickness of the body and/or the one or more reeds or membranes is the same. In such an arrangement, when the one or more reeds or membranes are connected to the body, the thickness of the membrane valve is generally uniform. In one non-limiting embodiment of the invention, the top surface and/or bottom surface of the one or more reeds or membranes, when connected to the body, lie in the same and/or parallel plane as the top and/or bottom surface of the body; however, this is not required. In one non-limiting configuration, the top surface of the one or more reeds or membranes, when connected to the body, lies in the same plane as the top surface of the body, and the bottom surface of the one or more reeds or membranes lies in the same plane as the bottom surface of the body.

In still another and/or alternative aspect of the present invention, the connection arrangement between the body of the membrane valve and at least one of the reeds or membranes is located at the rear portion of the reed or membrane. In one non-limiting embodiment of the invention, the connection arrangement on the reed or membrane is located at the rear end of the reed or membrane, or at a location that is spaced from rear end a distance that is less than 40% of the maximum longitudinal length of the reed or membrane, typically at a location that is spaced from rear end a distance that is less than 30% of the maximum longitudinal length of the reed or membrane, more typically at a location that is spaced from rear end a distance that is less than 20% of the maximum longitudinal length of the reed or membrane, still more typically at a location that is spaced from rear end a distance that is less than 18% of the maximum longitudinal length of the reed or membrane, and yet more typically at a location that is spaced from rear end a distance that is less than 16% of the maximum longitudinal length of the reed or membrane.

In yet another and/or alternative aspect of the present invention, at least a portion of the outer edge of the at least one of the reeds or membranes is spaced from the body when the reed or membrane is connected to the body; however, this is not required. In one non-limiting embodiment of the invention, a majority of the outer edge of at least one of the reeds or membranes is spaced from the body when the reed or membrane is connected to the body, typically at least about 55% of the outer edge of at least one of the reeds or membranes is spaced from the body when the reed or membrane is connected to the body, typically at least about 60% of the outer edge of at least one of the reeds or membranes is spaced from the body when the reed or membrane is connected to the body, more typically at least about 65% of the outer edge of at least one of the reeds or membranes is spaced from the body when the reed or membrane is connected to the body, still more typically at least about 70% of the outer edge of at least one of the reeds or membranes is spaced from the body when the reed or membrane is connected to the body, and yet still more typically at least about 72% of the outer edge of at least one of the reeds or membranes is spaced the body when the reed or membrane is connected to the body. The space between the outer edge of the reed or membrane and the body can be constant or non-constant. The space between the outer edge of the reed or membrane and the body is generally less than about 15% the maximum width of the reed or membrane, typically less than about 10% the maximum width of the reed or membrane, more typically less than about 8% the maximum width of the reed or membrane, and still more typically less than about 5% the maximum width of the reed or membrane.

In still another and/or alternative aspect of the present invention, a majority of the rear portion of the reed or member that is in contact with the body is not connected to by the compression fit connection. Generally less than about 45% of the rear portion of the reed or member that is in contact with the body is connected to by the compression fit connection, typically less than about 40% of the rear portion of the reed or member that is in contact with the body is connected to by the compression fit connection, more typically less than about 35% of the rear portion of the reed or member that is in contact with the body is connected to by the compression fit connection, still more typically less than about 30% of the rear portion of the reed or member that is in contact with the body is connected to by the compression fit connection, yet still more typically less than about 25% of the rear portion of the reed or member that is in contact with the body is connected to by the compression fit connection, and even more typically less than about 20% of the rear portion of the reed or member that is in contact with the body is connected to by the compression fit connection.

In still yet another and/or alternative aspect of the present invention, the membrane valve is made of a substantially thin metallic plate of a certain material which has, at its outermost radial area, at least one hole configuring the lodging for the usual escape valve and several holes for the assembly of the valve on a determined device such as, but not limited to, a compressor.

In another and/or alternative aspect of the present invention, the membrane valve can be partially or fully coated on the top and/or bottom surface by a coating that can be used to as a gasket to form a seal when the membrane valve is inserted in a device; however, this is not required. The coating can be a silicon coating and/or polymer coating. The thickness of the coating is non-limiting. Generally the coating, when used, has a uniform thickness. Generally the coating is applied about the reed opening. The coating can also or alternatively be applied about one or more of the holes in the body. The coating, when used, is not considered a connection arrangement for connecting the reed or membrane to the body for purposes of this invention.

In still another and/or alternative aspect of the present invention, the process for manufacturing the membrane valve of the present invention has the following non-limiting advantages in relation to the other existing valves:

a. Cost reduction of the membrane valve by 1) using less expensive materials for the body, 2) less punctures are required due to faster rounding of the corners of the membrane valve, and/or 3) the body needs only to be deburred.

b. Increased service life of the membrane valve due to the better rounding of the corners and the optional use of harder materials for the manufacture of the reed or membrane.

c. Joining of the reed or membrane to the body without interfering with the quality and technical characteristics of the membrane valve (e.g., not adversely affecting the uniform thickness of the membrane valve, etc.).

d. Joining of the reed or membrane to the body without interfering with the hardness, mechanical resistance, and flexibility of any one of the parts of the membrane valve.

e. Mechanical joining of the reed or membrane to the body without the use of an adhesive, weld, solder or other component improves the quality and durability of the connection between the body and the one or more reeds or membranes.

f. Joining of the reed or membrane to the body can be done automatically, which can lower the final cost of the membrane valve.

g. The manufacturing process of the present invention allows for more manufacturing and assembly versatility, thus allowing the work to be made with a reduced stock of raw material and finished parts, which can, at the same time, meet the modern standards of production such as the "just in time" standard.

h. The manufacturing process of the present invention results in a technical performance that is more advantageous than other existing valves, due to a better selection of manufacturing materials which increases its yield.

i. This design allows for use of all reeds with same raw material grain direction, increasing fatigue life and/or reliability of reeds.

j. The design has several advantages such as better edge radius, use of raw material grain direction can support thickness reduction of new reed valves, and/or increasing compressor performance.

k. The current design reduces dead volume (slot×reed thickness), thus increasing compressor efficiency.

l. The complete top surface of the one or more reeds or membranes, when connected to the body, can lie in the same plane as the top surface of the body, and the complete bottom surface of the one or more reeds or membranes can lie in the same plane as the bottom surface of the body thereby more closely matching the profile of a single piece membrane valve.

It is one non-limiting objective of the present invention to provide an efficient method so that two or more parts of a membrane valve are held together.

It is another and/or alternative non-limiting objective of the present invention to provide a method to join one or more parts of a membrane valve without interfering with the quality and technical characteristics of the membrane valve.

It is still another and/or alternative non-limiting objective of the present invention to provide a method to join one or more parts of a membrane valve while maintaining the flat aspect (i.e., without increasing the thickness) of the membrane valve.

It is yet another and/or alternative non-limiting objective of the present invention to provide a method to join one or more parts of a membrane valve without interfering with the hardness, mechanical resistance, and flexibility of the components (e.g., body, membrane or reed) of the membrane valve.

It is still yet another and/or alternative non-limiting objective of the present invention to provide a method to join one or more parts of a membrane valve without forming a residual part which will eventually have to be removed from the membrane valve.

It is another and/or alternative non-limiting objective of the present invention to provide a method to join one or more parts of a membrane valve that utilizes a joining arrangement that does not react with the parts of the membrane valve.

It is still another and/or alternative non-limiting objective of the present invention to provide a method to join one or more parts of a membrane valve that is less time consuming, reduces manufacturing costs, and/or reduces raw material costs.

It is yet another and/or alternative non-limiting objective of the present invention to provide a method to join one or more parts of a membrane valve that enables the use of less expensive materials to manufacture the body of the membrane valve.

It is still yet another and/or alternative non-limiting objective of the present invention to provide a membrane valve having a technical performance that is substantially more advantageous than other existing valves, due to a better selection of manufacturing materials which increases its yield.

It is another and/or alternative non-limiting objective of the present invention to provide a method to join one or more parts of a membrane valve that provides manufacturing and assembly versatility, thus allowing the work to be made with a reduced stock of raw material and finished parts, which can, at the same time, meet the modern standards of production such as the "just in time" standard.

It is still another and/or alternative non-limiting objective of the present invention to provide a membrane valve having one or more corners softened or rounded in order to avoid tension accumulation of the membrane being used, allowing for a longer service life.

It is yet another and/or alternative non-limiting objective of the present invention to provide a membrane valve having a smaller radial gap or slot between one or more of the elongated cuts and the respective membrane defined by such cuts. This dead volume (slot×reed thickness) can be reduced.

It is still yet another and/or alternative non-limiting objective of the present invention to provide a membrane valve wherein the connection arrangement between the body of the membrane valve and at least one of the reeds or membranes is a compression fit connection.

It is another and/or alternative non-limiting objective of the present invention to provide a membrane valve wherein the body of the membrane valve and at least one of the reeds or membranes is formed of a different material.

It is still another and/or alternative non-limiting objective of the present invention to provide a membrane valve wherein the body is formed of a material that is more deformable than the material used to form one or more of the reeds or membranes.

It is yet another and/or alternative non-limiting objective of the present invention to provide a membrane valve wherein the body is formed of a material that is more deformable than the material used to form all of the reeds or membranes.

It is still yet another and/or alternative non-limiting objective of the present invention to provide a membrane valve wherein the body is formed of a material that has a hardness that is less than the hardness of one or more of the reeds or membranes.

It is another and/or alternative non-limiting objective of the present invention to provide a membrane valve wherein the connection arrangement includes a compression fit connection formed of one or more recesses on the side and/or end of the reeds or membranes and the body that includes corresponding connection extensions that are designed to fit in a corresponding recess when the reed or membrane is connected to the body.

It is still another and/or alternative non-limiting objective of the present invention to provide a membrane valve wherein the connection arrangement includes a compression fit connection formed of one or more recesses on the body and the side and/or end of the reeds or membranes that includes corresponding connection extensions that are designed to fit in a corresponding recess when the reed or membrane is connected to the body.

It is yet another and/or alternative non-limiting objective of the present invention to provide a membrane valve wherein the shape of the connection extension for a particular recess has a shape that is generally the same as the shape of the recess.

It is still yet another and/or alternative non-limiting objective of the present invention to provide a membrane valve wherein the cross-sectional area of the portion of the connection extension that is to be inserted into a particular recess is greater than a cross-sectional area of the recess so that a compression fit is formed when the connection extension is inserted into the recess.

It is another and/or alternative non-limiting objective of the present invention to provide a membrane valve wherein the entrance to the recess has a width that is less than a maximum cross-sectional length of a portion of the recess that is recessed or spaced from the entrance.

It is still another and/or alternative non-limiting objective of the present invention to provide a membrane valve wherein the recess includes a C-shaped portion.

It is yet another and/or alternative non-limiting objective of the present invention to provide a membrane valve wherein the entrance to one or more recess has a radius of curvature.

It is still yet another and/or alternative non-limiting objective of the present invention to provide a membrane valve wherein the edge of the recess that is to first contact a corresponding connection extension when the reed or membrane is being connected to the body can be a tapered surface.

It is another and/or alternative non-limiting objective of the present invention to provide a membrane valve wherein the edge of the connection extension that is to first contact a corresponding recess when the reed or membrane is being connected to the body can be a tapered surface.

These and other objects and advantages will become apparent from the following description and drawings.

BRIEF DESCRIPTION OF DRAWINGS

Reference may now be made to the drawings, which illustrate various embodiments that the invention may take in physical form and in certain parts and arrangements of parts wherein.

Figure 1:
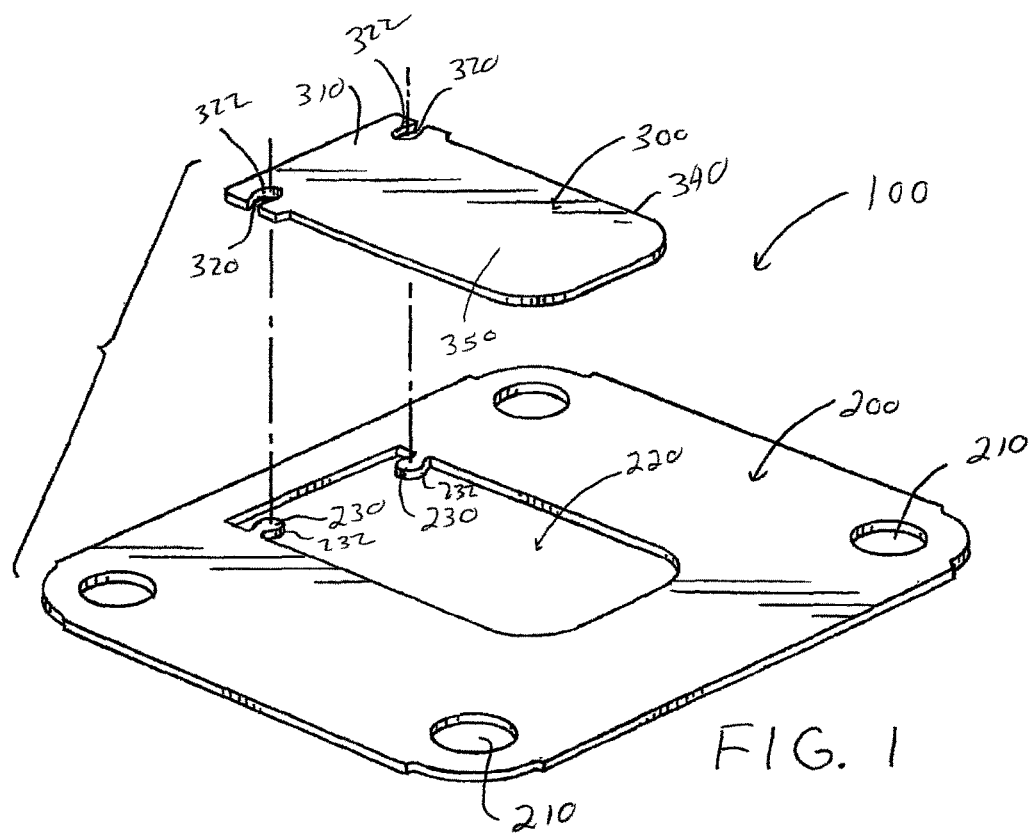
FIG. 1 is an exploded view of a non-limiting membrane valve in accordance with the present invention.

DESCRIPTION OF NON-LIMITING
EMBODIMENTS OF THE INVENTION

Referring now to the drawings wherein the showing is for the purpose of illustrating non-limiting embodiments of the invention only and not for the purpose of limiting the same, there is illustrated in FIGS. 1-13 a multi-piece membrane valve in accordance with the present invention. The membrane valve can be used in different suction valves for hermetic or semi-hermetic compressors used in domestic or commercial refrigeration systems, including different automotive or non-automotive air-conditioning units. As can be appreciated, the membrane valve of the present invention can be used in many of applications.

Figure 8:
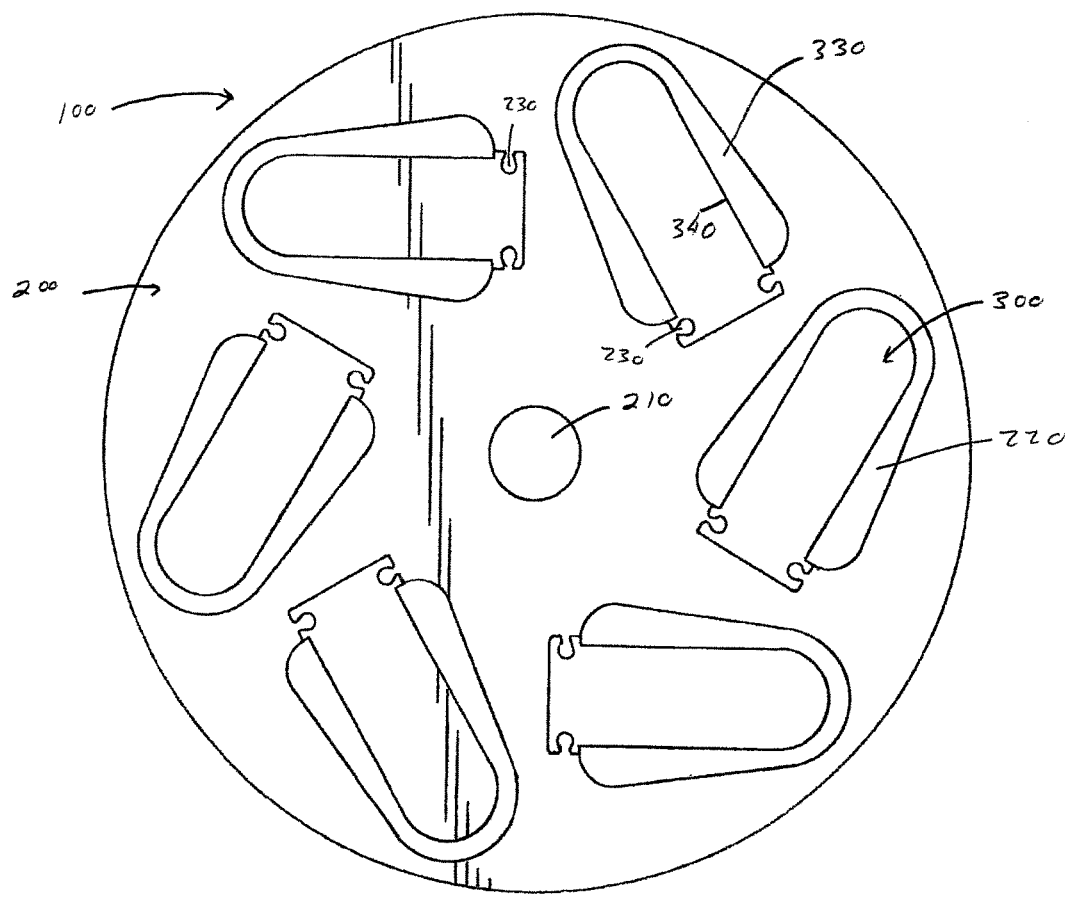
FIG. 8 is a modified version of the membrane valve of FIG. 1 wherein the compression fit is located at the sides of each of the plurality of reed or membrane and the shape of the openings on the body and the shapes of the reed or membrane are modified.
Figure 9:
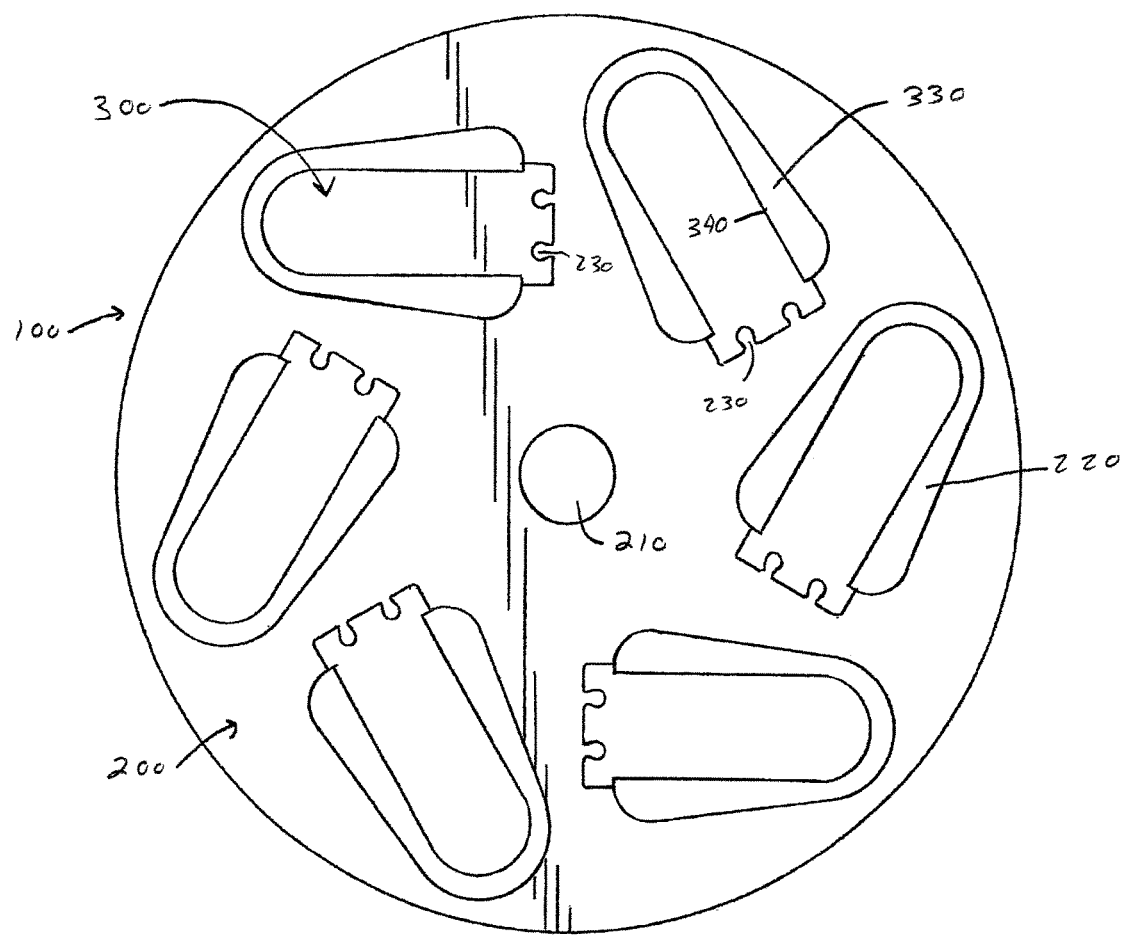
FIG. 9 is a modified version of the membrane valve of FIG. 1 wherein the compression fit is located at the rear end of each of the plurality of reed or membrane and the shape of the openings on the body and the shapes of the reed or membrane are modified.
Figure 10:
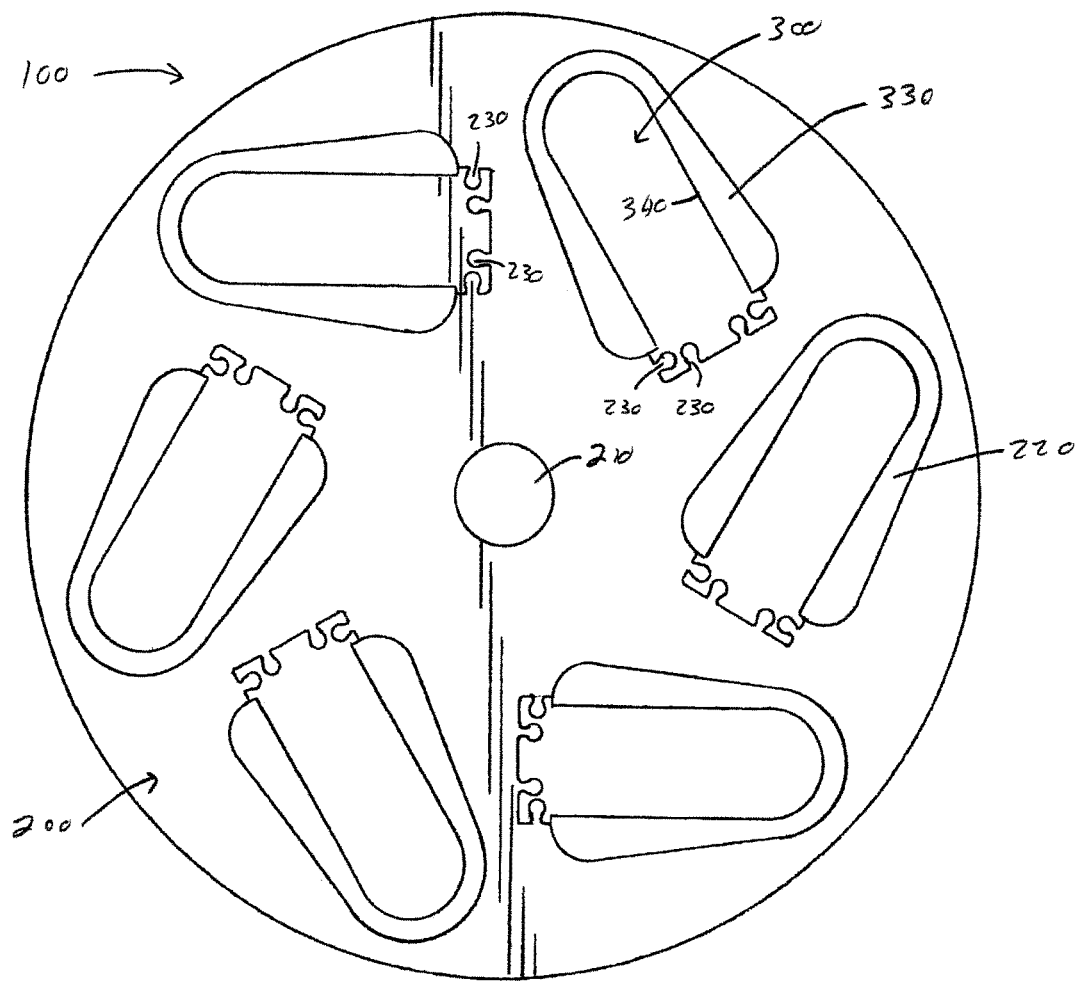
FIG. 10 is a modified version of the membrane valve of FIG. 1 wherein the compression fit is located at both the sides and rear end of each of the plurality of reed or membrane and the shape of the openings on the body and the shapes of the reed or membrane are modified.

As illustrated in the Figures, the membrane valve can have a variety of different configurations. The configurations illustrated in the Figures only represent a few of the possible configurations of the membrane valve of the present invention. The membrane valve 100 includes a body 200 and at least one reed or membrane 300. The body of the membrane valve is generally made of a thin metallic plate of a certain material. As can be appreciated, the body can be formed of other or additional materials. The size, shape, configuration and thickness of the body are non-limiting. As illustrated in FIGS. 1-7 and 11-13, the body has a generally square or rectangular shape. As illustrated in FIGS. 8-10, the body has a generally circular shape. The body is illustrated as having a generally constant thickness; however, this is not required. The body generally includes one or more holes 210 that are used in conjunction with the valve assembly on a compressor or other device. As can be appreciated, the one or more holes can be used for a variety of functions. The number, size, shape, configuration and location of the one or more holes in the body are non-limiting. As illustrated in FIGS. 1-7 and 11-13, the body includes four holes that are positioned near the each of the four corners of the body. The size and shape of the openings are illustrated as being the same; however, this is not required. The openings are illustrated as having a circular shape; however, other or additional shapes can be used (e.g., oval, polygonal, star shaped, etc.). As illustrated in FIGS. 8-10, the body includes a single opening located at or near the center of the body. The opening is illustrated as having a circular shape; however, other or additional shapes can be used (e.g., oval, polygonal, star shaped, etc.).

Figure 11:
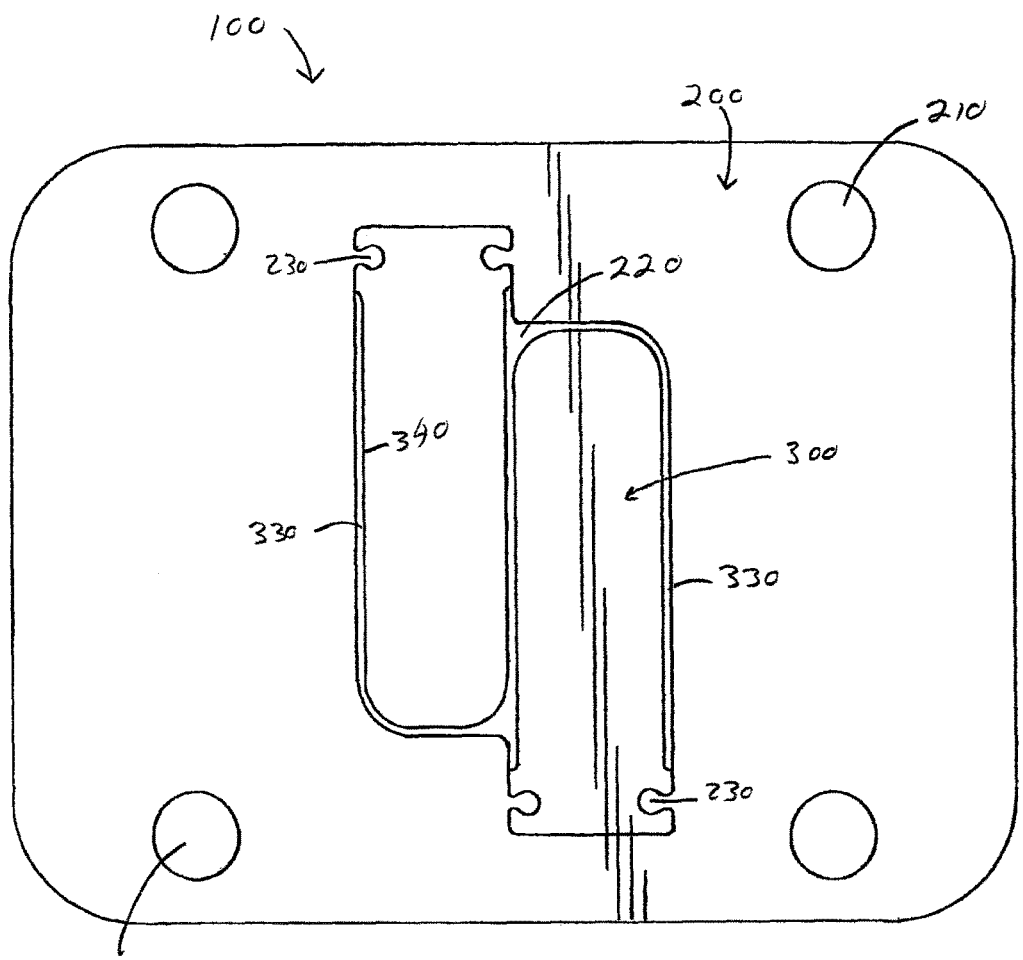
FIG. 11 is a modified version of the membrane valve of FIG. 1 wherein the compression fit is located at the sides of each of the plurality of reed or membrane and the shape of the openings on the body and the shapes of the reed or membrane are modified.
Figure 12:
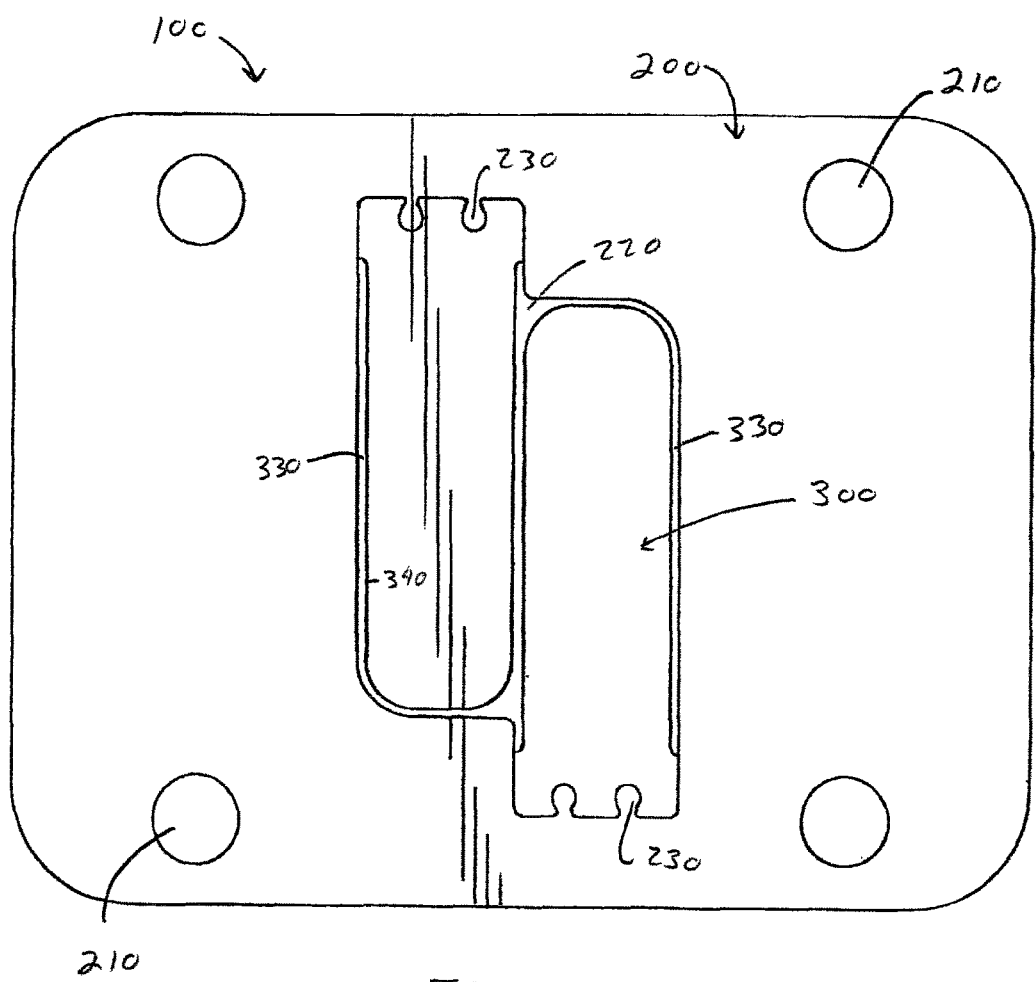
FIG. 12 is a modified version of the membrane valve of FIG. 1 wherein the compression fit is located at the rear end of each of the plurality of reed or membrane and the shape of the openings on the body and the shapes of the reed or membrane are modified; and, FIG. 13 is a modified version of the membrane valve of FIG. 1 wherein the compression fit is located at both the sides and rear end of each of the plurality of reed or membrane and the shape of the openings on the body and the shapes of the reed or membrane are modified.
Figure 13:
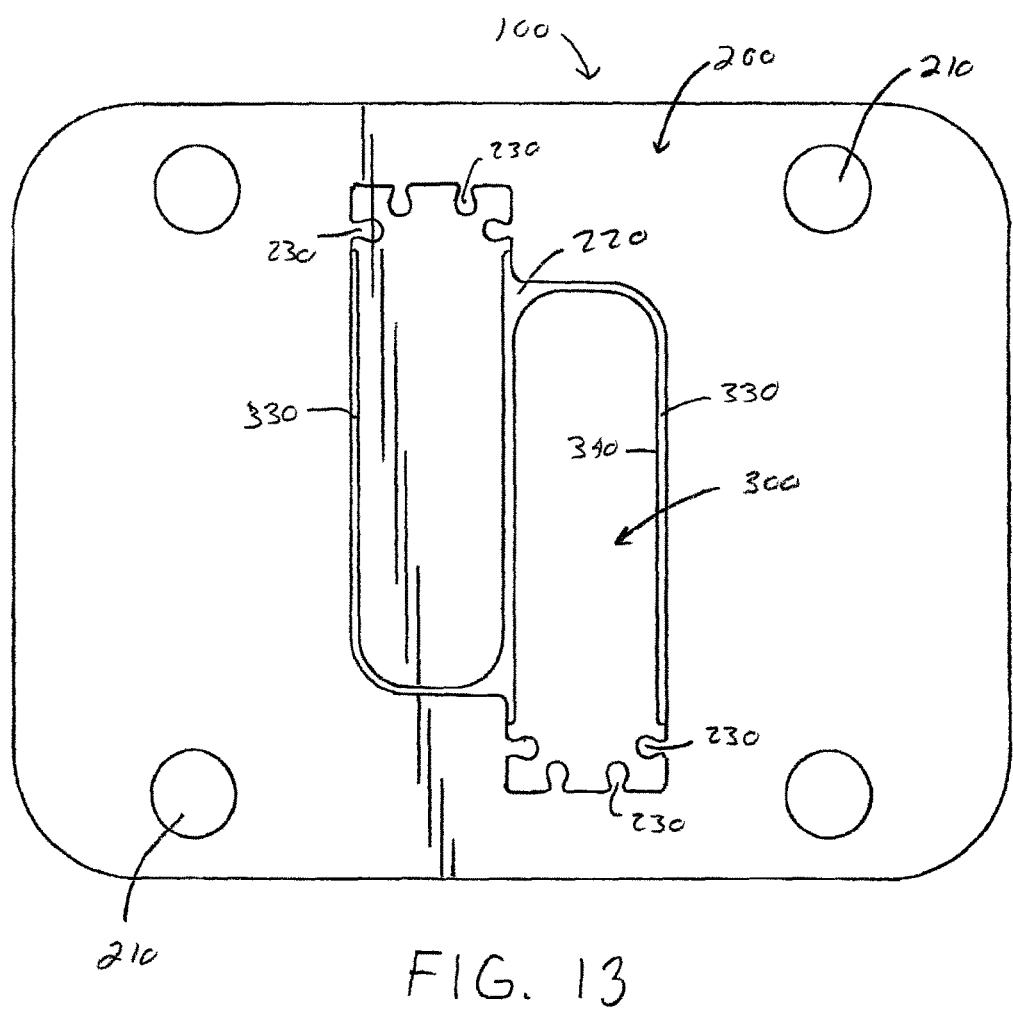

The body also includes one or more reed openings 220. The number, size, shape, configuration and location of the one or more reed openings in the body are non-limiting. As illustrated in FIGS. 1-7 and 11-13, the body includes a single reed opening. As illustrated in FIGS. 8-10, the body includes six reed openings. One or more of the reed openings is designed to receive a reed or membrane 300. As illustrated in FIGS. 1-10, each of the reed openings includes a single reed or membrane 300. As illustrated in FIGS. 11-13, each of the reed openings includes two reeds or membranes 300. As can be appreciated, more than two reeds or membranes can be received in one or more of the reed openings. The outer edges of the body, the one or more holes, and/or the one or more reed openings can be deburred and/or rounded; however, this is not required.

One or more of the reed openings that are designed to receive a reed or membrane include a compression fit arrangement that includes one or more recesses and/or connection extensions. As illustrated in FIGS. 1-13, the reed openings each include a plurality of connection extensions 230. As can be appreciated, the reed opening can include a single connection extension. As also can be appreciated, one or more reed openings can include one or more recesses instead of one or more connection extensions. As also can be appreciated, one or more reed openings can include both one or more recesses and one or more connection extensions. The location of the one or more recesses and/or connection extensions in the reed opening is non-limiting. As illustrated in FIGS. 1-10, the connection extensions in the reed opening are positioned at one end of the reed opening. As illustrated in FIGS. 11-13, the connection extensions in the reed opening are positioned at two ends of the reed opening.

The size, shape and configuration of the connection extensions are non-limiting. As illustrated in FIGS. 1-13, the connection extensions are in the shape of a lollipop or standard light bulb. The connection extensions have a neck that extends outwardly from the side of the reed opening and which terminates into a circular-shaped end portion. The maximum cross-sectional width of the end portion is greater than the thinnest width of the neck; however, this is not required. The top and bottom surface of the connection extensions lie in the same plane as the top and bottom surface of the body; however, this is not required. The edges 232 of the connection extensions are typically rounded or tapered so as to facilitate in the insertion of the connection extensions into the recesses 320 of the reeds or membranes; however, this is not required.

As illustrated in FIGS. 1-13, the rear portion 310 of each of the reeds or membranes includes one or more recesses or slots 320. The size, shape and configuration of the recess is similar or the same as the shape of the connection extensions. The edges 322 of the recess can be rounded or tapered so as to facilitate in the insertion of the connection extensions 230 into the recesses 320 of the reeds or membranes; however, this is not required.

As best illustrated in FIG. 1, the rear portion of the reed or membrane has a width that is the same or similar to the width of the reed opening that is designed to receive the rear portion of the reed or membrane. As illustrated in FIGS. 2-13, once the reed or membrane is inserted into the reed opening, the top and bottom surface of the reed or membrane lie in the same plane as the top and bottom surface of the body. The compression fit between the reed or membrane and body are unique in that the top and bottom surface of the point of connection between the body and reed or membrane generally lies in the same plane as the top and bottom surface of the body and the reed or membrane. As such, the top and bottom surface of the region about the recesses and the top and bottom surface of the connection extensions lie in the same plane when the reed or membrane is connected to the body.

The longitudinal length of the rear portion of the reed or membrane is generally less than 40% the longitudinal length of the reed or membrane, typically the rear portion of the reed or membrane is generally less than 30% the longitudinal length of the reed or membrane, more typically the rear portion of the reed or membrane is generally less than 25% the longitudinal length of the reed or membrane, and still more typically the rear portion of the reed or membrane is generally less than 20% the longitudinal length of the reed or membrane.

A majority of the outer edge 340 of the front portion 350 of the reed or membrane is spaced from the edge of the reed opening to form a slot 330 between the body and the reed or membrane. As illustrated in FIGS. 2-13, the edge of the front portion of the reed or membrane is spaced from the edge of the reed opening.

Figure 2:
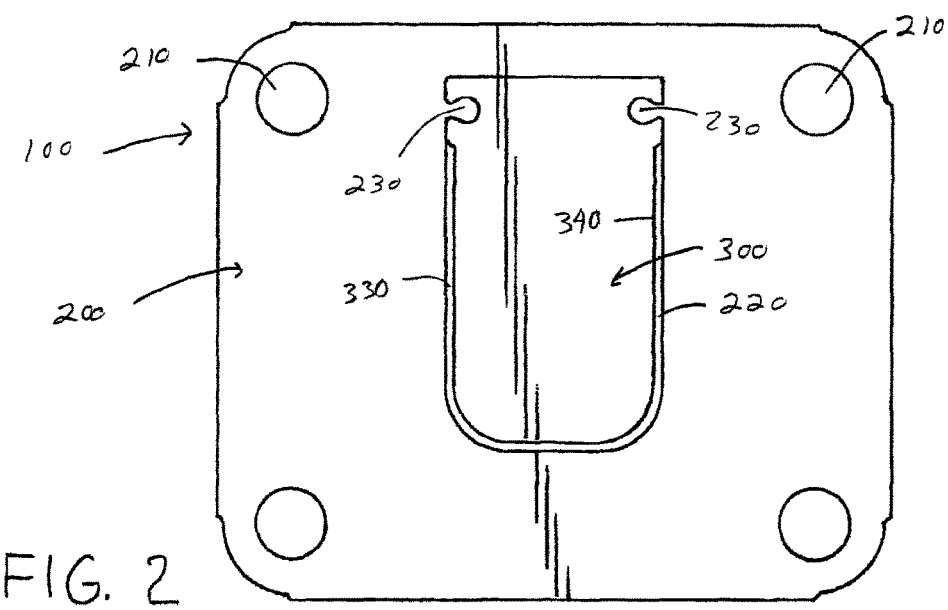
FIG. 2 is a top plan view of the assembled membrane valve of FIG. 1.

As illustrated in FIGS. 1-2, two connection extensions 230 extend from each side of the reed opening 220 and are inserted in two corresponding recesses 320 on the sides of the rear portion of the reed or membrane 300. The two recesses on the reed or membrane are positioned on opposite sides of the reed and membrane, are spaced the same distance from the rear edge of the reed or membrane, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of the reed or membrane has a width such that a majority or all of the outer edge of the rear portion contacts the edge of the reed opening when the reed or membrane is connected to the body. As illustrated in FIG. 2, all of the outer edge of the front portion of the reed or membrane is spaced from the edge of the reed opening when the reed or membrane is connected to the body. The size and shape of the slot 330 is constant at about at least 90% of the outer edge of the front portion. The edge 232 of the connection extensions 230 includes a rounded or tapered edge so as to facilitate in the insertion of the connection extensions into the recesses of the reed or membrane. The transition between the outer edge of the rear portion and the front portion is a tapered or angled portion; however, this is not required. The reed or membrane is formed of a different material than the body. When the reed or membrane is connected to the body, the top and bottom surface of the reed or membrane lie in the same plane as the top and bottom surface of the body.

Figure 3:
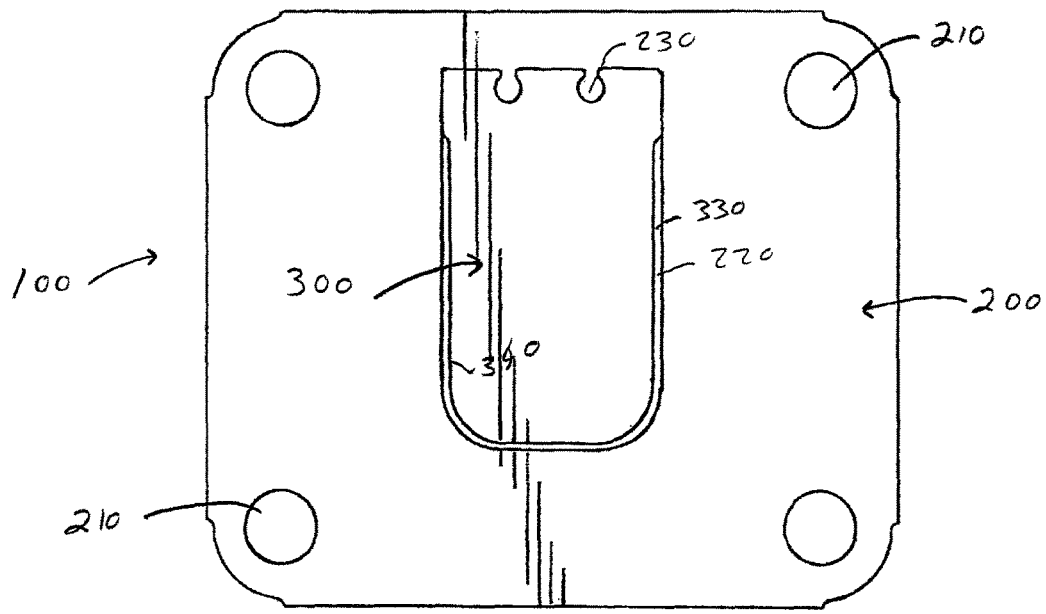
FIG. 3 is a modified version of the membrane valve of FIG. 1 wherein the compression fit is located at the rear end of the reed or membrane.

As illustrated in FIG. 3, two connection extensions 230 extend from the rear of the reed opening 220 and are inserted in two corresponding recesses 320 on the rear end of the rear portion of the reed or membrane 300. The two recesses on the reed or membrane are spaced the same distance from a side edge of the reed or membrane, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of the reed or membrane has a width such that a majority or all of the outer edge of the rear portion contacts the edge of the reed opening when the reed or membrane is connected to the body. As illustrated in FIG. 3, all of the outer edge of the front portion of the reed or membrane is spaced from the edge of the reed opening when the reed or membrane is connected to the body. The size and shape of the slot 330 is constant at about at least 90% of the outer edge of the front portion. The edge 232 of the connection extensions 230 includes a rounded or tapered edge so as to facilitate in the insertion of the connection extensions into the recesses of the reed or membrane. The transition between the outer edge of the rear portion and the front portion is a tapered or angled portion; however, this is not required. The reed or membrane is formed of a different material than the body. When the reed or membrane is connected to the body, the top and bottom surface of the reed or membrane lie in the same plane as the top and bottom surface of the body.

Figure 4:
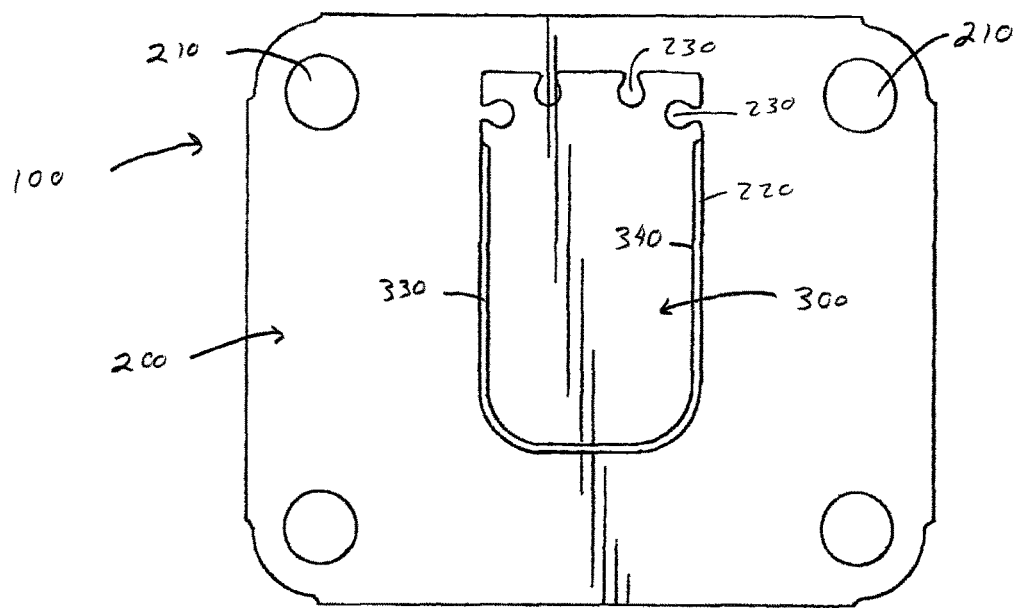
FIG. 4 is a modified version of the membrane valve of FIG. 1 wherein the compression fit is located at both the sides and the rear end of the reed or membrane.

As illustrated in FIG. 4, two connection extensions 230 extend from each side of the reed opening 220 and are inserted in two corresponding recesses 320 on the sides of the rear portion of the reed or membrane 300, and two connection extensions 230 extend from the rear of the reed opening 220 and are inserted in two corresponding recesses 320 on the rear end of the rear portion of the reed or membrane 300. The two recesses on the side of the reed or membrane are positioned on opposite sides of the reed and membrane, are spaced the same distance from the rear edge of the reed or membrane, and are the same size, configuration and shape. The two recesses on the rear of the reed or membrane are spaced the same distance from a side edge of the reed or membrane, and are the same size, configuration and shape. Each pair of recesses located about a corner of the rear portion of the reed or membrane are spaced equal distances from one another. All four recesses have the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of the reed or membrane has a width such that a majority or all of the outer edge of the rear portion contacts the edge of the reed opening when the reed or membrane is connected to the body. As illustrated in FIG. 4, all of the outer edges of the front portion of the reed or membrane is spaced from the edge of the reed opening when the reed or membrane is connected to the body. The size and shape of the slot 330 is constant at about at least 90% of the outer edge of the front portion. The edge 232 of the connection extensions 230 includes a rounded or tapered edge so as to facilitate in the insertion of the connection extensions into the recesses of the reed or membrane. The transition between the outer edge of the rear portion and the front portion is a tapered or angled portion; however, this is not required. The reed or membrane is formed of a different material than the body. When the reed or membrane is connected to the body, the top and bottom surface of the reed or membrane lie in the same plane as the top and bottom surface of the body.

Figure 5:
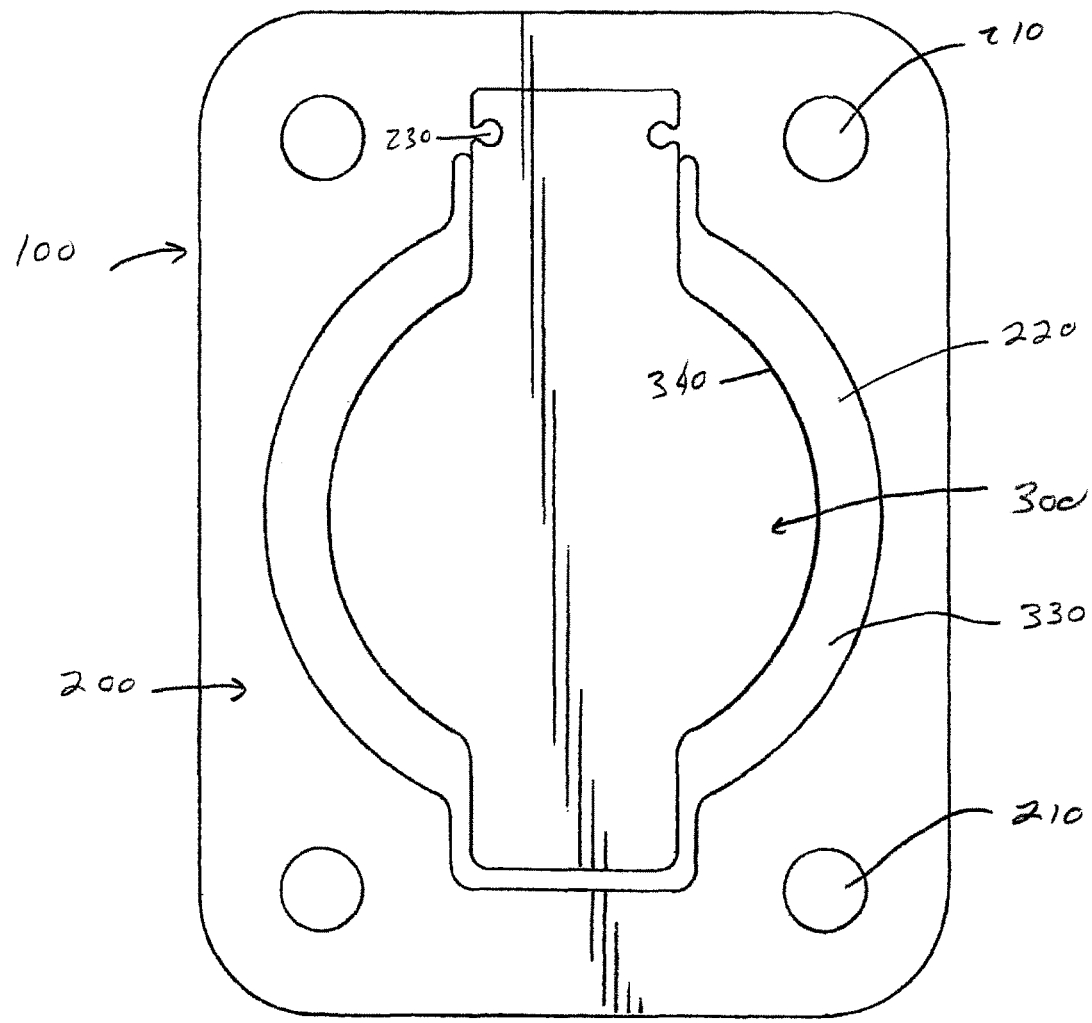
FIG. 5 is a modified version of the membrane valve of FIG. 1 wherein the compression fit is located at the sides of the reed or membrane and the shape of the opening on the body and the shape of the reed or membrane are modified.

As illustrated in FIG. 5, two connection extensions 230 extend from each side of the reed opening 220 and are inserted in two corresponding recesses 320 on the sides of the rear portion of the reed or membrane 300. The two recesses on the reed or membrane are positioned on opposite sides of the reed and membrane, are spaced the same distance from the rear edge of the reed or membrane, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of the reed or membrane has a width such that a majority or all of the outer edge of the rear portion contacts the edge of the reed opening when the reed or membrane is connected to the body. As illustrated in FIG. 5, all of the outer edge of the front portion of the reed or membrane is spaced from the edge of the reed opening when the reed or membrane is connected to the body. The size and shape of the slot 330 is not constant about the outer edge of the front portion. The edge 232 of the connection extensions 230 include a rounded or tapered edge so as to facilitate in the insertion of the connection extensions into the recesses of the reed or membrane. The reed or membrane is formed of a different material than the body. When the reed or membrane is connected to the body, the top and bottom surface of the reed or membrane lie in the same plane as the top and bottom surface of the body.

Figure 6:
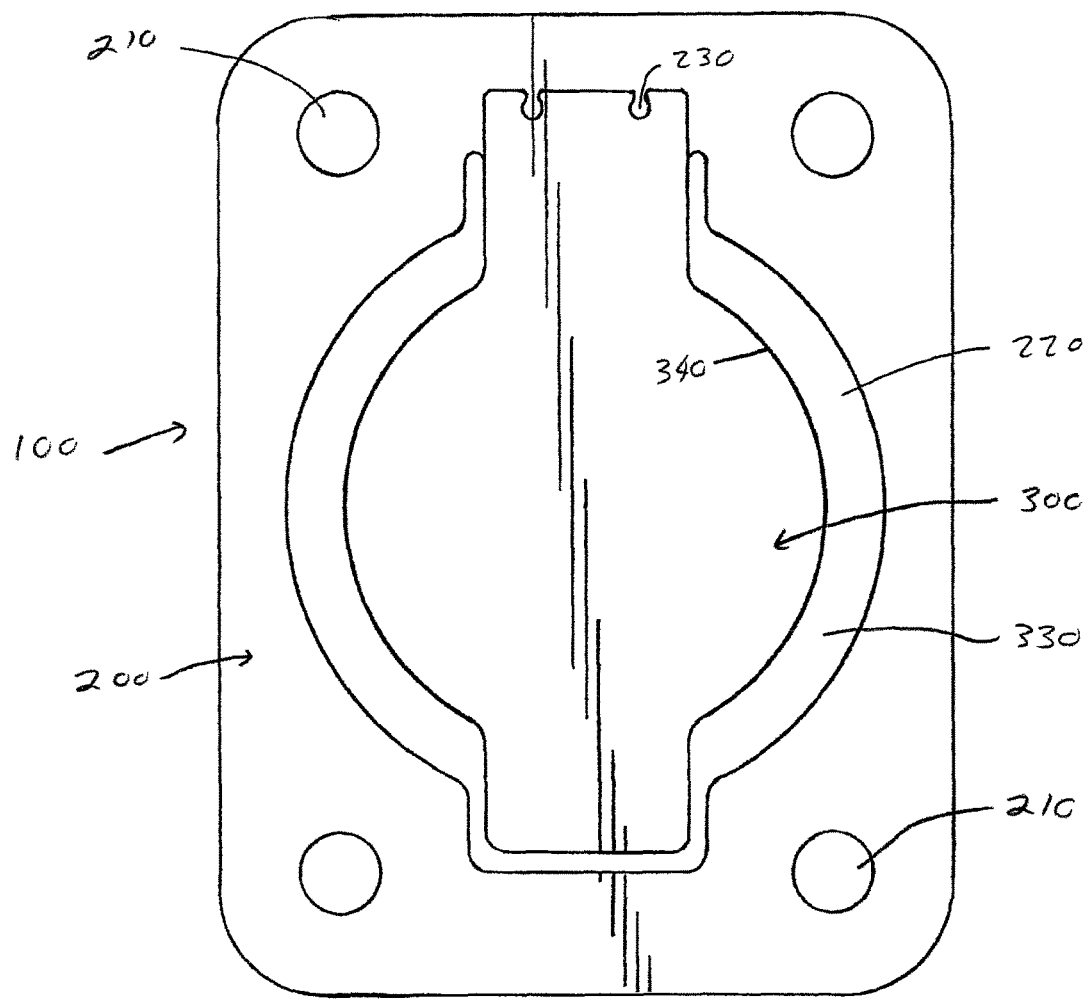
FIG. 6 is a modified version of the membrane valve of FIG. 1 wherein the compression fit is located at the rear end of the reed or membrane and the shape of the opening on the body and the shape of the reed or membrane are modified.

As illustrated in FIG. 6, two connection extensions 230 extend from the rear of the reed opening 220 and are inserted in two corresponding recesses 320 on the rear end of the rear portion of the reed or membrane 300. The two recesses on the reed or membrane are spaced the same distance from a side edge of the reed or membrane, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of the reed or membrane has a width such that a majority or all of the outer edge of the rear portion contacts the edge of the reed opening when the reed or membrane is connected to the body. As illustrated in FIG. 6, all of the outer edge of the front portion of the reed or membrane is spaced from the edge of the reed opening when the reed or membrane is connected to the body. The size and shape of the slot 330 is not constant about the outer edge of the front portion. The edge 232 of the connection extensions 230 includes a rounded or tapered edge so as to facilitate in the insertion of the connection extensions into the recesses of the reed or membrane. The reed or membrane is formed of a different material than the body. When the reed or membrane is connected to the body, the top and bottom surface of the reed or membrane lie in the same plane as the top and bottom surface of the body.

Figure 7:
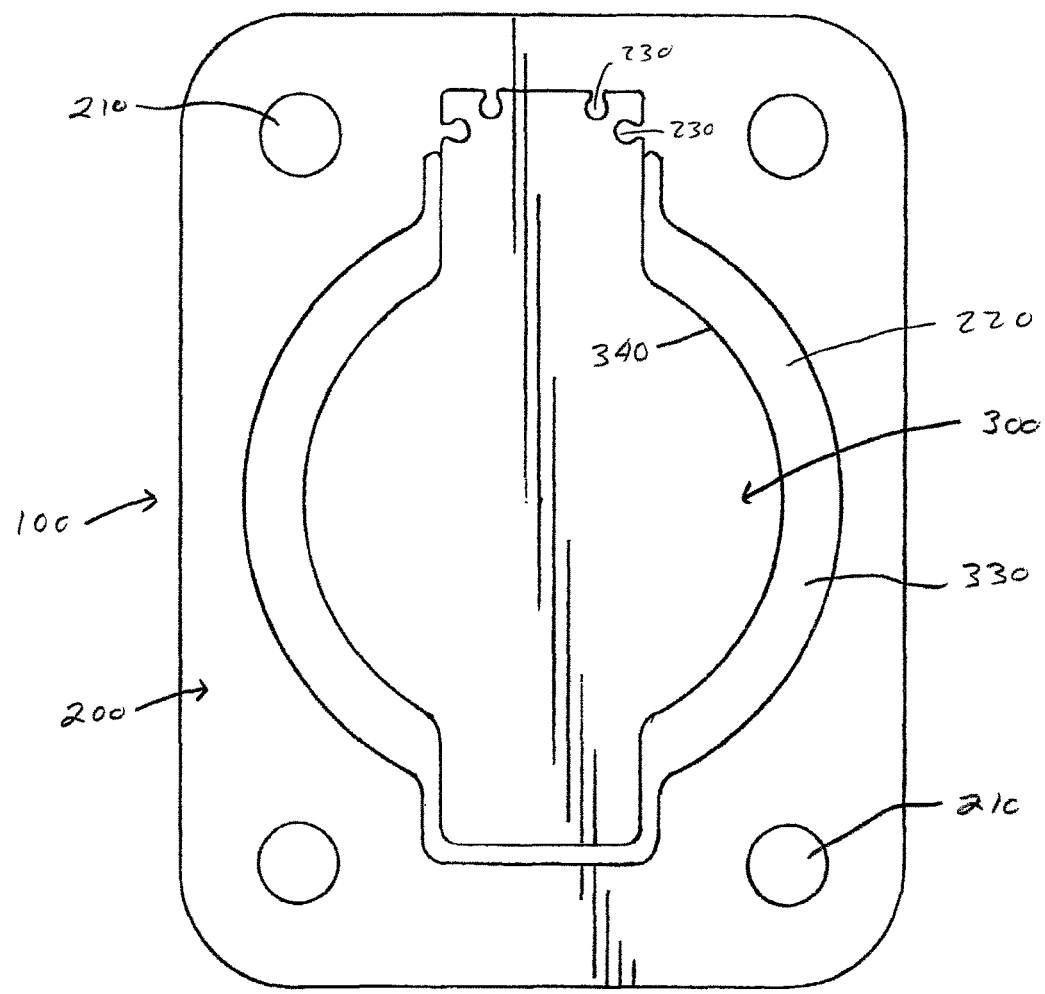
FIG. 7 is a modified version of the membrane valve of FIG. 1 wherein the compression fit is located at both the sides and the rear end of the reed or membrane and the shape of the opening on the body and the shape of the reed or membrane are modified.

As illustrated in FIG. 7, two connection extensions 230 extend from each side of the reed opening 220 and are inserted in two corresponding recesses 320 on the sides of the rear portion of the reed or membrane 300, and two connection extensions 230 extend from the rear of the reed opening 220 and are inserted in two corresponding recesses 320 on the rear end of the rear portion of the reed or membrane 300. The two recesses on the side of the reed or membrane are positioned on opposite sides of the reed and membrane, are spaced the same distance from the rear edge of the reed or membrane, and are the same size, configuration and shape. The two recesses on the rear of the reed or membrane are spaced the same distance from a side edge of the reed or membrane, and are the same size, configuration and shape. Each pair of recesses located about a corner of the rear portion of the reed or membrane are spaced equal distances from one another. All four recesses have the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of the reed or membrane has a width such that a majority or all of the outer edge of the rear portion contacts the edge of the reed opening when the reed or membrane is connected to the body. As illustrated in FIG. 7, all of the outer edge of the front portion of the reed or membrane is spaced from the edge of the reed opening when the reed or membrane is connected to the body. The size and shape of the slot 330 is not constant about the outer edge of the front portion. The edge 232 of the connection extensions 230 includes a rounded or tapered edge so as to facilitate in the insertion of the connection extensions into the recesses of the reed or membrane. The reed or membrane is formed of a different material than the body. When the reed or membrane is connected to the body, the top and bottom surface of the reed or membrane lie in the same plane as the top and bottom surface of the body.

As illustrated in FIG. 8, two connection extensions 230 extend from each side of the reed opening 220 and are inserted in two corresponding recesses 320 on the sides of the rear portion of each of the reeds or membranes 300. The two recesses on each of the reeds or membranes are positioned on opposite sides of each of the reeds and membranes, are spaced the same distance from the rear edge of each of the reeds or membranes, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of each of the reeds or membranes has a width such that a majority or all of the outer edge of the rear portion contacts the edge of the reed opening when each of the reeds or membranes are connected to the body. As illustrated in FIG. 8, all of the outer edge of the front portion of each of the reeds or membranes is spaced from the edge of the reed opening when each of the reeds or membranes are connected to the body. The size and shape of the slot 330 is not constant about the outer edge of the front portion. The edge 232 of the connection extensions 230 includes a rounded or tapered edge so as to facilitate in the insertion of the connection extensions into the recesses of each of the reeds or membranes. Each of the reeds or membranes is formed of a different material than the body. When each of the reeds or membranes are connected to the body, the top and bottom surface of each of the reeds or membranes lie in the same plane as the top and bottom surface of the body.

As illustrated in FIG. 9, two connection extensions 230 extend from the rear of the reed opening 220 and are inserted in two corresponding recesses 320 on the rear end of the rear portion of each of the reeds or membranes 300. The two recesses on each of the reeds or membranes are spaced the same distance from a side edge of the reed or membrane, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of each of the reeds or membranes has a width such that a majority or all of the outer edge of the rear portion contacts the edge of the reed opening when each of the reeds or membranes are connected to the body. As illustrated in FIG. 9, all of the outer edge of the front portion of each of the reeds or membranes is spaced from the edge of the reed opening when each of the reeds or membranes are connected to the body. The size and shape of the slot 330 is not constant about the outer edge of the front portion. The edge 232 of the connection extensions 230 includes a rounded or tapered edge so as to facilitate in the insertion of the connection extensions into the recesses of each of the reeds or membranes. Each of the reeds or membranes is formed of a different material than the body. When each of the reeds or membranes are connected to the body, the top and bottom surface of each of the reeds or membranes lie in the same plane as the top and bottom surface of the body.

As illustrated in FIG. 10, two connection extensions 230 extend from each side of the reed opening 220 and are inserted in two corresponding recesses 320 on the sides of the rear portion of each of the reeds or membranes 300, and two connection extensions 230 extend from the rear of the reed opening 220 and are inserted in two corresponding recesses 320 on the rear end of the rear portion of each of the reeds or membranes 300. The two recesses on the side of each of the reeds or membranes are positioned on opposite sides of each of the reeds and membranes, are spaced the same distance from the rear edge of each of the reeds or membranes, and are the same size, configuration and shape. The two recesses on the rear of each of the reeds or membranes are spaced the same distance from a side edge of each of the reeds or membranes, and are the same size, configuration and shape. Each pair of recesses located about a corner of the rear portion of each of the reeds or membranes are spaced equal distances from one another. All four recesses have the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of each of the reeds or membranes have a width such that a majority or all of the outer edge of the rear portion contacts the edge of the reed opening when each of the reeds or membranes are connected to the body. As illustrated in FIG. 10, all of the outer edge of the front portion of each of the reed or membranes is spaced from the edge of the reed opening when each of the reeds or membranes are connected to the body. The size and shape of the slot 330 is not constant about the outer edge of the front portion. The edge 232 of the connection extensions 230 includes a rounded or tapered edge so as to facilitate in the insertion of the connection extensions into the recesses of each of the reeds or membranes. Each of the reeds or membranes is formed of a different material than the body. When each of the reeds or membranes are connected to the body, the top and bottom surface of each of the reeds or membranes lie in the same plane as the top and bottom surface of the body.

As illustrated in FIG. 11, two connection extensions 230 extend from each side of the reed opening 220 and are inserted in two corresponding recesses 320 on the sides of the rear portion of each of the reeds or membranes 300. The two recesses on each of the reeds or membranes are positioned on opposite sides of each of the reeds and membranes, are spaced the same distance from the rear edge of each of the reeds or membranes, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of each of the reeds or membranes has a width such that a majority or all of the outer edge of the rear portion contacts the edge of the reed opening when each of the reeds or membranes are connected to the body. As illustrated in FIG. 11, a single reed opening in the body is configured to receive two reeds or membranes. The two reeds or membranes are oriented in opposite directions from one another; however, this is not required. The longitudinal axis of the two reeds is parallel to one another; however, this is not required. The side edge of the reeds or membranes that are positioned adjacent to one another are spaced from one another. The spacing is illustrated as being constant; however, this is not required. As illustrated in FIG. 11, all of the outer edge of the front portion of each of the reeds or membranes is spaced from the edge of the reed opening when each of the reeds or membranes are connected to the body. The size and shape of the slot 330 is constant at about at least 70% of the outer edge of the front portion. The edge 232 of the connection extensions 230 includes a rounded or tapered edge so as to facilitate in the insertion of the connection extensions into the recesses of each of the reeds or membranes. The transition between the outer edge of the rear portion and the front portion is a tapered or angled portion; however, this is not required. Each of the reeds or membranes is formed of a different material than the body. When each of the reeds or membranes are connected to the body, the top and bottom surface of each of the reeds or membranes lie in the same plane as the top and bottom surface of the body.

As illustrated in FIG. 12, two connection extensions 230 extend from the rear of the reed opening 220 and are inserted in two corresponding recesses 320 on the rear end of the rear portion of each of the reeds or membranes 300. The two recesses on each of the reeds or membranes are spaced the same distance from a side edge of the reed or membrane, and are the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of each of the reeds or membranes has a width such that a majority or all of the outer edge of the rear portion contacts the edge of the reed opening when each of the reeds or membranes are connected to the body. As illustrated in FIG. 12, a single reed opening in the body is configured to receive two reeds or membranes. The two reeds or membranes are oriented in opposite directions from one another; however, this is not required. The longitudinal axis of the two reeds is parallel to one another; however, this is not required. The side edge of the reeds or membranes that are positioned adjacent to one another is spaced from one another. The spacing is illustrated as being constant; however, this is not required. As illustrated in FIG. 11, all of the outer edge of the front portion of each of the reeds or membranes are spaced from the edge of the reed opening when each of the reeds or membranes are connected to the body. The size and shape of the slot 330 is constant at about at least 70% of the outer edge of the front portion. The edge 232 of the connection extensions 230 includes a rounded or tapered edge so as to facilitate in the insertion of the connection extensions into the recesses of each of the reeds or membranes. The transition between the outer edge of the rear portion and the front portion is a tapered or angled portion; however, this is not required. Each of the reeds or membranes is formed of a different material than the body. When each of the reeds or membranes are connected to the body, the top and bottom surface of each of the reeds or membranes lie in the same plane as the top and bottom surface of the body.

As illustrated in FIG. 13, two connection extensions 230 extend from each side of the reed opening 220 and are inserted in two corresponding recesses 320 on the sides of the rear portion of each of the reeds or membranes 300, and two connection extensions 230 extend from the rear of the reed opening 220 and are inserted in two corresponding recesses 320 on the rear end of the rear portion of each of the reeds or membranes 300. The two recesses on the side of each of the reeds or membranes are positioned on opposite sides of each of the reeds and membranes, are spaced the same distance from the rear edge of each of the reeds or membranes, and are the same size, configuration and shape. The two recesses on the rear of each of the reeds or membranes are spaced the same distance from a side edge of each of the reeds or membranes, and are the same size, configuration and shape. Each pair of recesses located about a corner of the rear portion of each of the reeds or membranes are spaced equal distances from one another. All four recesses have the same size, configuration and shape. The shape of the extension member that is to be inserted into a corresponding recess is the same shape of the recess. The size of the extension member is slightly larger than the size of the recess so that the extension member is caused to slightly deform when inserted into the recess. The insertion of the extension member into the recess may also or alternatively cause the recess to slightly deform; however, this is not required. The rear portion of each of the reeds or membranes has a width such that a majority or all of the outer edge of the rear portion contacts the edge of the reed opening when each of the reeds or membranes are connected to the body. As illustrated in FIG. 13, a single reed opening in the body is configured to receive two reeds or membranes. The two reeds or membranes are oriented in opposite directions from one another; however, this is not required. The longitudinal axis of the two reeds is parallel to one another; however, this is not required. The side edge of the reeds or membranes that are positioned adjacent to one another is spaced from one another. The spacing is illustrated as being constant; however, this is not required. As illustrated in FIG. 11, all of the outer edge of the front portion of each of the reeds or membranes are spaced from the edge of the reed opening when each of the reeds or membranes are connected to the body. The size and shape of the slot 330 is constant at about at least 70% of the outer edge of the front portion. The edge 232 of the connection extensions 230 includes a rounded or tapered edge so as to facilitate in the insertion of the connection extensions into the recesses of each of the reeds or membranes. The transition between the outer edge of the rear portion and the front portion is a tapered or angled portion; however, this is not required. Each of the reeds or membranes is formed of a different material than the body. When each of the reeds or membranes are connected to the body, the top and bottom surface of each of the reeds or membranes lie in the same plane as the top and bottom surface of the body.

The manufacturing process of the membrane valve generally includes one or more of the following steps:
 a. provide a body 200, with at least one hole 210 that is used as an opening for the lodging of the escape valve and/or to guide the assemblage and fix the assembly to a determined device (e.g., compressor, etc.), and with at least one reed opening 220, when reed opening is spaced from the outer edge of the body;
 b. provide a body or membrane 300 which is designed to be connected in the reed opening;
 c. optionally provide the softening of the edges of the reed or membrane in order to integrally round them;
 d. insert the reed or membrane into the reed opening; and,
 e. permanently and irreversibly joining the body 200 to the reed or membrane 300 by use of a compression fit arrangement wherein an extension member is inserted into a recess to form a compression fit.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:
1. A membrane valve comprising:
 a. a planar body having a reed opening, said planar body including a plurality of extension members that each extend into said reed opening;
 b. a planar membrane positioned within said reed opening of said planar body in a coplanar relationship with said body, said planar membrane having a front portion and a rear portion, said rear portion including a back end, a first side and a second side, said rear portion including a plurality of recesses, each of said recesses including an opening located at a perimeter of said rear portion, a width of said opening is less than a maximum width of said recess, said rear portion having a) first and second recesses located on said back end and spaced from said first and second sides, b) a first recess positioned on said first side and spaced from said back end, and a second recess positioned on said second side and spaced from said back end, and c) a combination of a) and b), said planar body is formed of a different material than said planar membrane; and,
 c. a connection arrangement for connecting said planar membrane to said planar body formed by each of said extension members friction fitted in one of a corresponding recess to secure said planar membrane to said planar body, said connection arrangement enabling said planar membrane to pivotally move relative to said planar body, a front region of said planar membrane spaced from said planar body to define a gap between said planar membrane and said planar body when said planar membrane is connected to said planar body, said connection between each of said extension members and said recesses is absent a weld, solder, braze, adhesive, or binding agent, said connection arrangement is a compression fit connection, said compression fit connection causes each of said extension members, said recesses, or combinations thereof to deform when each of said extension members is inserted into each of said recesses.

2. The membrane as defined in claim 1, wherein a top surface of said planar body lies in a same plane as a top surface of said planar membrane when said planar membrane is connected to said planar body, a bottom surface of said planar body lies in a same plane as a bottom surface of said planar membrane when said planar membrane is connected to said planar body, a top surface of each of said extension members lies in a same plane as said top surface of said planar membrane when said planar membrane is connected to said planar body, a bottom surface of each of said extension members lies in a same plane as said bottom surface of said planar membrane when said planar membrane is connected to said planar body.

3. The membrane as defined in claim 2, wherein said first side of said rear portion of said planar membrane includes said first recess, said second side of said rear portion of said planar membrane includes said second recess, a distance of said first recess from said back end is equal to a distance of said second recess from said back end, said first and second recesses having a same shape and size.

4. The membrane as defined in claim 3, wherein said back end of said rear portion of said planar membrane includes said first and second recesses, a distance of said first recess from said first side equal to a distance of said second recess from said second side, said first and second recesses having a same shape and size.

5. The membrane as defined in claim 4, wherein said first side of said rear portion of said planar membrane includes a third recess, said second side of said rear portion of said planar membrane includes a fourth recess, a distance of said third recess from said back end is equal to a distance of said fourth recess from said back end, said third and fourth recesses having a same shape and size.

6. The membrane as defined in claim 5, wherein a front region of said peripheral edge of said planar membrane is rounded.

7. The membrane valve as defined in claim 6, wherein said membrane valve is for installation between mating surfaces of a cylinder block and a valve head of a compressor for creating a uni-directional flow of fluids through said compressor, said membrane can pivotally move relative to said body near said first end when said body is secured between said cylinder block and said valve head.

8. The membrane valve as defined in claim 6, for use in a hermetic type compressor having a cylinder block containing a cylinder opening to a flat block mating surface and a valve head with valving passages opening to a flat head mating surface, said membrane valve interposed in a sealing relationship between said flat mating surfaces of said cylinder block and valve head for allowing uni-directional fluid flow between said valve passages and said valve head.

9. The membrane as defined in claim 1, wherein said back end of said rear portion of said planar membrane includes said first and second recesses, a distance of said first recess from said first side equal to a distance of said second recess from said second side, said first and second recesses having a same shape and size.

10. The membrane as defined in claim 9, wherein said first side of said rear portion of said planar membrane includes a third recess, said second side of said rear portion of said planar membrane includes a fourth recess, a distance of said third recess from said back end is equal to a distance of said fourth recess from said back end, said third and fourth recesses having a same shape and size.

11. The membrane as defined in claim 1, wherein said first side of said rear portion of said planar membrane includes said first recess, said second side of said rear portion of said planar membrane includes said second recess, a distance of said first recess from said back end is equal to a distance of said second recess from said back end, said first and second recesses having a same shape and size.

12. The membrane as defined in claim 1, wherein a front region of said peripheral edge of said planar membrane is rounded.

13. The membrane valve as defined in claim 1, wherein said membrane valve is for installation between mating surfaces of a cylinder block and a valve head of a compressor for creating a uni-directional flow of fluids through said compressor, said membrane can pivotally move relative to said body near said first end when said body is secured between said cylinder block and said valve head.

14. The membrane valve as defined in claim 1, for use in a hermetic type compressor having a cylinder block containing a cylinder opening to a flat block mating surface and a valve head with valving passages opening to a flat head mating surface, said membrane valve interposed in a sealing relationship between said flat mating surfaces of said cylinder block and valve head for allowing uni-directional fluid flow between said valve passages and said cylinder.

15. A membrane valve comprising:
a. a planar body having a reed opening, said planar body including a plurality of extension members that each extend into said reed opening, each of said extension members including a body portion and a head portion, a maximum width of said head portion greater than a width of an end of said body portion that is connected to said head portion;

b. a planar membrane positioned within said reed opening of said planar body in a coplanar relationship with said body, said planar membrane having a front portion and a rear portion, said rear portion including a back end, a first side and a second side, said rear portion including a plurality of recesses, each of said recesses including an opening located at a perimeter of said rear portion, a width of said opening is less than a maximum width of said recess, said rear portion having a) first and second recesses located on said back end and spaced from said first and second sides, b) a first recess positioned on said first side and spaced from said back end, and a second recess positioned on said second side and spaced from said back end, and c) a combination of a) and b), said planar body is formed of a different material than said planar membrane; and, c. a connection arrangement for connecting said planar membrane to said planar body formed by by a compression fit wherein each of said extension members are friction fitted in one of a corresponding recess to secure said planar membrane to said planar body such that at least a portion of said head of said extension member is positioned in said corresponding recess of said planar member, said connection arrangement enabling said planar membrane to pivotally move relative to said planar body, a front region of said planar membrane spaced from said planar body to define a gap between said planar membrane and said planar body when said planar membrane is connected to said planar body, said connection between each of said extension members and said recesses is absent a weld, solder, braze, adhesive, or binding agent, said connection arrangement is a compression fit connection that causes each of said extension members, said recesses, or combinations thereof to deform when each of said extension members is inserted into each of said recesses.

16. The membrane as defined in claim 15, wherein said back end of said rear portion of said planar membrane includes said first and second recesses, a distance of said first recess from said first side equal to a distance of said second recess from said second side, said first and second recesses having a same shape and size.

17. The membrane as defined in claim 16, wherein said first side of said rear portion of said planar membrane includes a third recess, said second side of said rear portion of said planar membrane includes a fourth recess, a distance of said third recess from said back end is equal to a distance of said fourth recess from said back end, said third and fourth recesses having a same shape and size.

18. The membrane valve as defined in claim 17, wherein said membrane valve is for installation between mating surfaces of a cylinder block and a valve head of a compressor for creating a uni-directional flow of fluids through said compressor, said membrane configured to pivotally move relative to said body near said first end when said body is secured between said cylinder block and said valve head.

19. The membrane valve as defined in claim 17, for use in a hermetic type compressor having a cylinder block containing a cylinder opening to a flat block mating surface and a valve head with valving passages opening to a flat head mating surface, said membrane valve interposed in a sealing relationship between said flat mating surfaces of said cylinder block and valve head for allowing uni-directional fluid flow between said valve passages and said cylinder.

20. The membrane valve as defined in claim 17, wherein said material that forms said planar body has a greater deformability than said material that forms said planar membrane, said material that forms said planar body has a hardness that is less than a hardness of said material that forms said planar membrane.

21. The membrane valve as defined in claim 16, wherein said membrane valve is for installation between mating surfaces of a cylinder block and a valve head of a compressor for creating a uni-directional flow of fluids through said compressor, said membrane configured to pivotally move relative to said body near said first end when said body is secured between said cylinder block and said valve head.

22. The membrane valve as defined in claim 16, for use in a hermetic type compressor having a cylinder block containing a cylinder opening to a flat block mating surface and a valve head with valving passages opening to a flat head mating surface, said membrane valve interposed in a sealing relationship between said flat mating surfaces of said cylinder block and valve head for allowing uni-directional fluid flow between said valve passages and said cylinder.

23. The membrane valve as defined in claim 16, wherein said material that forms said planar body has a greater deformability than said material that forms said planar membrane, said material that forms said planar body has a hardness that is less than a hardness of said material that forms said planar membrane.

24. The membrane valve as defined in claim 15, wherein said membrane valve is for installation between mating surfaces of a cylinder block and a valve head of a compressor for creating a uni-directional flow of fluids through said compressor, said membrane configured to pivotally move relative to said body near said first end when said body is secured between said cylinder block and said valve head.

25. The membrane valve as defined in claim 15, for use in a hermetic type compressor having a cylinder block containing a cylinder opening to a flat block mating surface and a valve head with valving passages opening to a flat head mating surface, said membrane valve interposed in a sealing relationship between said flat mating surfaces of said cylinder block and valve head for allowing uni-directional fluid flow between said valve passages and said cylinder.

26. The membrane valve as defined in claim 15, wherein said material that forms said planar body has a greater deformability than said material that forms said planar membrane, said material that forms said planar body has a hardness that is less than a hardness of said material that forms said planar membrane.

27. The membrane as defined in claim 15, wherein a top surface of said planar body lies in a same plane as a top surface of said planar membrane when said planar membrane is connected to said planar body, a bottom surface of said planar body lies in a same plane as a bottom surface of said planar membrane when said planar membrane is connected to said planar body, a top surface of each of said extension members lies in a same plane as said top surface of said planar membrane when said planar membrane is connected to said planar body, a bottom surface of each of said extension members lies in a same plane as said bottom surface of said planar membrane when said planar membrane is connected to said planar body.

28. The membrane as defined in claim 27, wherein said first side of said rear portion of said planar membrane includes said first recess, said second side of said rear portion of said planar membrane includes said second recess, a distance of said first recess from said back end is equal to a distance of said second recess from said back end, said first and second recesses having a same shape and size.

29. The membrane as defined in claim 27, wherein said back end of said rear portion of said planar membrane includes said first and second recesses, a distance of said first recess from said first side equal to a distance of said second recess from said second side, said first and second recesses having a same shape and size.

30. The membrane as defined in claim 29, wherein said first side of said rear portion of said planar membrane includes a third recess, said second side of said rear portion of said planar membrane includes a fourth recess, a distance of said third recess from said back end is equal to a distance of said fourth recess from said back end, said third and fourth recesses having a same shape and size.

31. The membrane as defined in claim 15, wherein said first side of said rear portion of said planar membrane includes said first recess, said second side of said rear portion of said planar membrane includes said second recess, a distance of said first recess from said back end is equal to a distance of said second recess from said back end, said first and second recesses having a same shape and size.

32. The membrane valve as defined in claim 31, wherein said membrane valve is for installation between mating surfaces of a cylinder block and a valve head of a compressor for creating a uni-directional flow of fluids through said compressor, said membrane configured to pivotally move relative to said body near said first end when said body is secured between said cylinder block and said valve head.

33. The membrane valve as defined in claim 31, for use in a hermetic type compressor having a cylinder block containing a cylinder opening to a flat block mating surface and a valve head with valving passages opening to a flat head mating surface, said membrane valve interposed in a sealing relationship between said flat mating surfaces of said cylinder block and valve head for allowing uni-directional fluid flow between said valve passages and said cylinder.

34. The membrane valve as defined in claim 31, wherein said material that forms said planar body has a greater deformability than said material that forms said planar membrane, said material that forms said planar body has a hardness that is less than a hardness of said material that forms said planar membrane.

* * * * *